United States Patent Office 3,025,564
Patented Mar. 20, 1962

3,025,564
APPARATUS FOR PRODUCING SMALL BODIES FROM A PLASTIC MASS
Wilfried Voigt, Wiesbaden-Biebrich, Germany, assignor, by mesne assignments, to Lonza Electric and Chemical Works Limited, Gampel (Wallis), Switzerland
Filed Oct. 30, 1958, Ser. No. 770,733
Claims priority, application Switzerland Nov. 1, 1957
7 Claims. (Cl. 18—12)

The present invention relates to apparatus for providing relatively small bodies from a plastic mass.

There are many thermoplastic materials which can be formed into masses which are in plastic condition with or without the addition of suitable plasticizers, stabilizers, lubricants, coloring materials, or filler materials, upon kneading together the components of the mixture at a suitable temperature.

The further treatment of such materials very often requires that these materials be in the form of relatively small bodies, and considerable difficulty is encountered in converting plastic masses into relatively small bodies because the plastic material which issues from an extruder, for example, is in a plastic, tacky condition and as a result even if it is cut into a plurality of small bodies, these bodies will undesirably stick to each other.

It is an object of the present invention to provide an apparatus which is capable of producing small bodies from a plastic mass in a maner which reliably prevents these bodies from sticking to each other.

Another object of the present invention is to provide an apparatus which will not only provide a plurality of small bodies which will not stick to each other, but which will in addition guarantee that the small bodies will all have uniform properties by providing for all parts of the plastic mass the very same treating conditions so that different parts of the mass are not, for example, subjected to different temperatures which would result in different properties in the final bodies.

It is also an object of the present invention to provide a structure capable of accomplishing the above objects and at the same time composed of simple and ruggedly constructed elements which are very reliable in operation.

With the above objects in view, the present invention includes in an apparatus for producing small bodies from a plastic mass, an extruder means having a discharge nozzle and extruding through this nozzle a material which is in a plastic, tacky condition. A cutting means is located next to this extruder nozzle to cut the material issuing therefrom into a plurality of bodies, and in accordance with the present invention a centrifugal means is located next to the cutting means for receiving the bodies therefrom, and for throwing these bodies, while maintaining them separate from each other, through a free space over a distance sufficient to cause the bodies to loose their tackiness while they are still in flight. Therefore, when the bodies are thereafter collected they will not stick to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
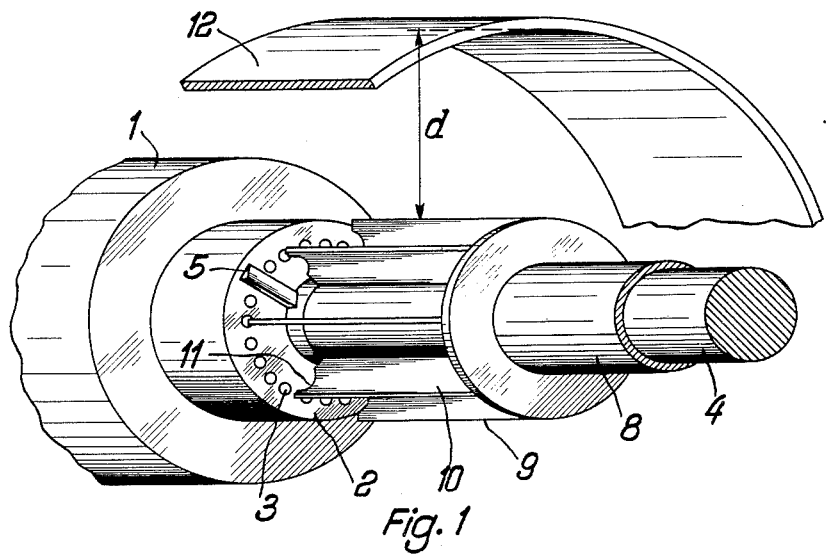
FIG. 1 is a fragmentary perspective view of one possible structure according to the present invention.

Referring now to the drawings, there is shown therein an extruder 1 which has a discharge nozzle 2 provided with a plurality of discharge outlets 3 which are distributed along a circle around a given axis which passes through the center of this circle. Such an extruder nozzle is conventional and well known in the art. The nozzle 2, however, is formed with an axial recess 7 extending from the outer surface thereof but terminating short of the inner surface thereof. In other words, the recess 7 does not extend completely through the nozzle and has a closed end.

Figure 2:
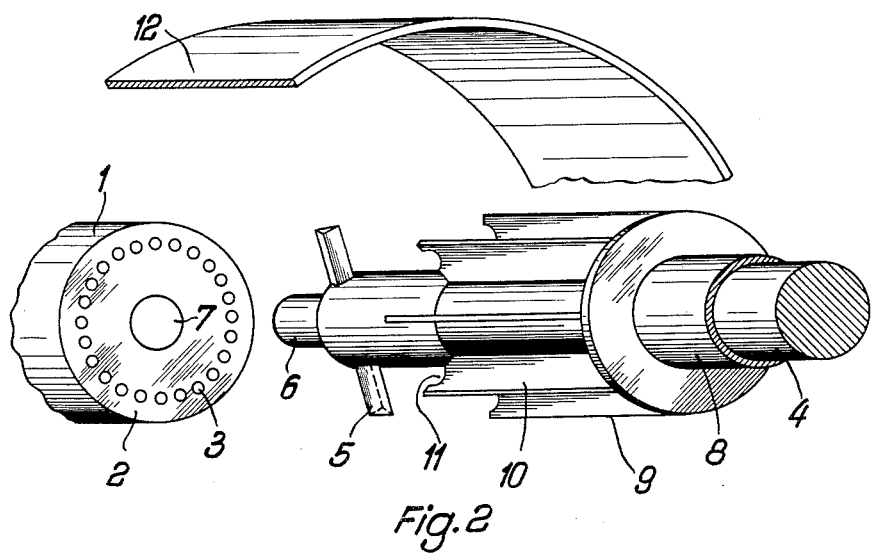
FIG. 2 is a fragmentary exploded perspective illustration of the structure of FIG. 1.

A shaft 4 is provided with an end portion 6 of reduced diameter which extends into the recess 7 and is freely turnable therein so that the nozzle 2 forms the left bearing for the shaft 4, as viewed in the drawings, and this shaft 4 carries next to the nozzle 2 a pair of cutting blades 5 which are located along a common axis which is normal to the axis of the shaft 4, so that the shaft 4 together with the blades 5 form a rotary cutting means rotating around the axis around which the discharge outlets 3 are distributed, and the blades 5 slide along the outer face of the nozzle 2, so that as the material is extruded through and beyond the outlets 3 by the extruder 1 and issues from the outlets 3 in plastic, tacky condition, this material is cut by the blades 5 into relatively small bodies which are still tacky. As may be seen from FIGS. 1 and 2, the blades 5 are of triangular cross section so that as the cutting edge of each blade 5 cuts the plastic material from the extruder outlet the cut material will then be engaged by an inclined surface which will reliably separate the material from the nozzle and advance it axially away from the nozzle.

In accordance with the present invention there is located directly next to the cutting means formed by the blades 5 on the side of the latter opposite from the nozzle 2 a centrifugal means for receiving the bodies of material formed by the blades 5 and axially advanced by the latter away from the nozzle 2 and for centrifugally throwing these bodies, while maintaining them separate from each other, outwardly away from the axis of the shaft 4 freely through a gas such as air, for example, over a distance which is sufficiently great to guarantee that the plastic bodies loose their tackiness while they are still in flight. This centrifugal means includes the elongated sleeve 8 which is freely turnable on the shaft 4 which extends through the sleeve 8. This sleeve 8 forms the hub of a rotary impeller which includes a plurality of blades or vanes 10 fixed to the exterior surface of the sleeve 8, extending axially therealong, distributed around the axis thereof, and extending radially away from the axis of the sleeve 8 in the manner shown in FIGS. 1 and 2. The bodies received by the vanes 10 will be thrown therefrom outwardly through the air surrounding the centrifugal means, and during their flight through the air the apparatus of the invention provides no structure which will engage these bodies until they have passed through a distance sufficient to guarantee that they have lost their tackiness. As will be apparent from the description below, the centrifugal means 8—10 rotate in a direction opposite to the direction of rotation of the blades 5, and the vanes 10 are located extremely close to the blades 5 while being axially spaced therefrom by a very slight distance to guarantee that the blades 5 do not engage the rotating vanes 10. The vanes 10 and the tubular hub 8 together form the rotary impeller 9. As the blades 5 rotate they will successively cut the plastic material issuing from the outlets 3, and this material will have issued through a given distance beyond the cutting edge of the blades 5 before being cut thereby.

In order to prevent the material issuing from the outlets 3 from being engaged by the vanes 10 before this material is cut by the blades 5, each of the vanes 10 is formed at its end adjacent to the nozzle 2 with a notch 11 which is located at a radial distance from the axis of the shaft 4 which is equal to the radial distance of the outlets 3 from this axis, so that the material issuing from the outlets 3 can enter into the notches 11 of the rotating vanes 10 without being engaged by these vanes, and these notches 11 are great enough to guarantee that the vanes 10 will not engage the material before it is cut by the blades 5.

A hollow cylindrical wall 12 is coaxially arranged around the centrifugal means 8—10 to receive the bodies thrown out by the centrifugal means 8—10, and the inner surface of the wall 12 is located at a distance $d$ from the outer tips of the vanes 10, this distance $d$ being great enough to guarantee that the bodies will have lost their tackiness before they engage the inner surface of the wall 12, i.e. the bodies lose their tackiness during flying from the vanes 10 to the wall 12 through the air therebetween.

The length of the bodies will be determined by the speed with which they issue from the outlets 3 and the speed of rotation of the cutting blades 5. As was pointed out above, the centrifugal means 8—10 rotates at a speed many times that of the blades 5, and the bodies are directly received by the vanes 10. The rotary speed of the centrifugal means in the opposite direction with respect to the blades 5 is so great, with respect to the rotary speed of the blades 5, that at any given time there is no more than one body between any pair of adjacent vanes 10, so that the structure of the invention guarantees that the bodies will remain out of engagement with each other while they are being thrown through the air in order to lose their tackiness. The bodies fly along entirely distinct paths and have no opportunity to engage each other while they are still tacky. After the bodies engage the wall 12, they fall to the bottom of the latter and are collected therefrom.

With the structure of the invention the air stream provided by the rotating vanes 10 just ahead of the nozzle 2 flows in an entirely symmetrical manner with respect to the circle of outlets 3, so that there is no non-uniform unsymmetrical cooling of the nozzle 2, and therefore with the structure of the invention there is no possibility of the nozzle 2 having different temperatures at some of the outlets 3 than at others of these outlets. Therefore there is no possibility of a lack of uniformity in the properties of the bodies.

As a specific example, the plastic material may be polyvinyl chloride to which has been added 10% by weight of a suitable plasticizer such as dioctyl-phthalate and 2% by weight of a suitable stabilizer, such as phenylindol. The extruder in this example is in a form of a double screw extruder including heating means. This extruder heats and kneads the material so that it issues in plastic, tacky condition at a temperature of about 200 centigrade from the nozzle which in this example is provided with outlets 3 each of which has a diameter of 4 mm. In this example the material issues from the outlets 3 at a speed of 40 cm. per minute, and the blades 5 are driven at a rotary speed of 50 revolutions per minute. As a result in this example the plastic material is cut by the blades 5 into bodies which are in plastic, tacky condition and which have a length of 4 mm. and a diameter of 4 mm. The rotary impeller 9 has an outer diameter in this example of 50 mm. and is provided with 16 vanes 10 angularly distributed about the axis of the impeller and equidistantly spaced from each other, and the impeller 9 is driven in a direction opposite to the direction of rotation of the blades 5 at a speed of 6000 revolutions per minute. Thus, in this example, the centrifugal means centrifuges the bodies outwardly away from the rotary axis thereof with a particularly strong centrifugal force, so that it is impossible for the bodies to adhere to the vanes 10 and they are immediately thrown centrifugally away from these vanes with a speed of about 800 metres per minute. By providing a sufficiently large distance $d$ such as 50 cm. between the vanes 10 and the inner surface of the hollow cylindrical wall 12, these bodies become hardened and lose their tackiness before they engage the inner surface of the wall 12. As may be seen from FIG. 3, a suitable carriage 13 or the like is provided for carrying the rotary cutting and centrifugal means of the invention so that the latter can be moved up to and away from the extruder 1. This carriage 13 carries an electric motor 14 which can be connected with any suitable source of current for driving this motor, and through the gear train 15 the motor 14 rotates the shaft 4 and the blades 5 therewith. A step-up transmission 16 drives a gear train 17 from the motor 14, and this gear train 17 drives the sleeve 8 on the shaft 4 in a direction opposite to the direction of rotation of the shaft 4 at a speed many times greater than that of the shaft 4. The carriage 13 is provided with a right end wall 18 which carries a bearing for the right end of the shaft 4, as viewed in FIG. 3, and suitable collars 19 are fixed to the shaft 4 and located respectively on opposite sides of the wall 18 so as to prevent axial movement of the shaft 4 with respect to the wall 18. The carriage 13 is provided with a wall 20 opposite from the wall 18 and carrying a bearing for the sleeve 8 which extends through the wall 20, suitable collars 21 being fixed to the sleeve 8 on opposite sides of the wall 20, respectively, as shown in FIG. 3, for preventing axial movement of the sleeve 8 with respect to the shaft 4.

Figure 3:
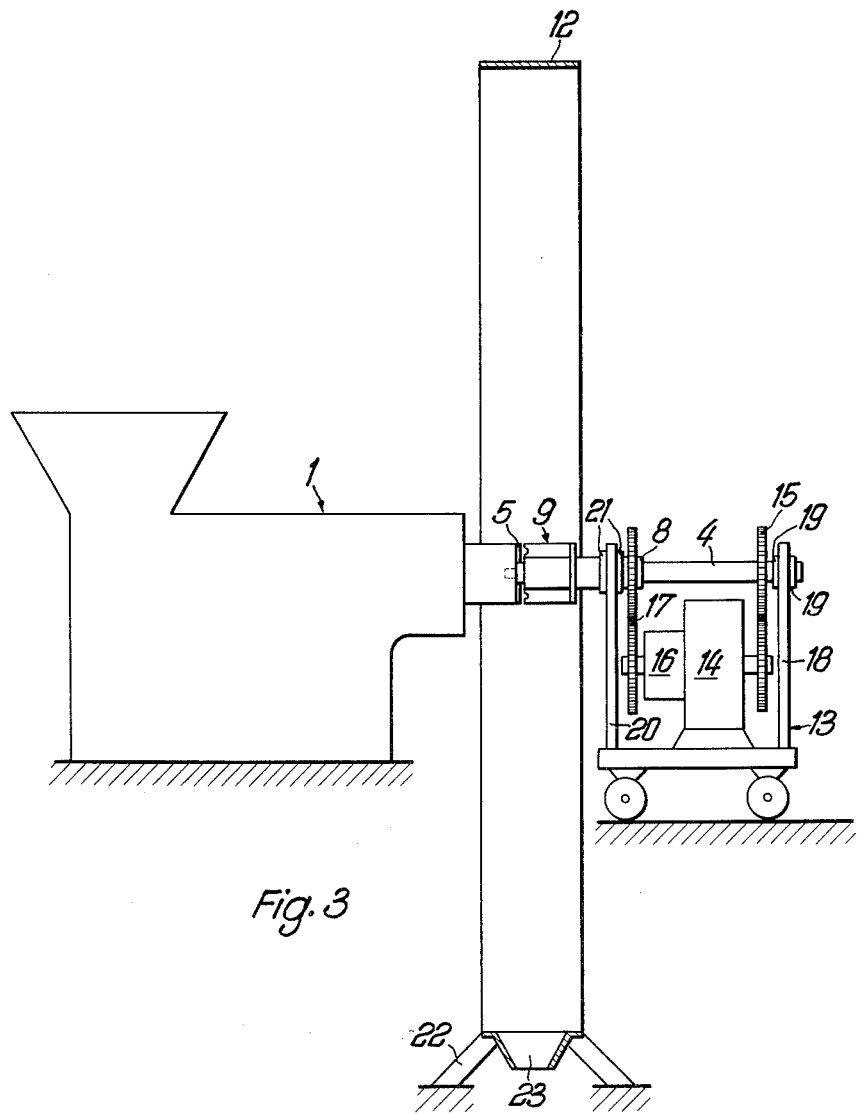
FIG. 3 is a partly sectional, side elevation, schematic illustration of a structure according to the present invention.

A suitable supporting structure 22 carries the cylindrical wall 12 in a manner shown in FIG. 3.

In the lower end of said wall 12 an opening 23 with a hopper shaped mouth is provided for passing the bodies therethrough and a suitable receptacle or a conveyor band (not shown in the drawing) is arranged below said opening 23 for receiving or carrying away the bodies collected within the wall 12 and fallen down through the opening 23 into the receptacle or onto the conveyor band respectively.

It will be understood that each of the elements described above, or two or more together, may also find a useful application in other types of apparatus for feeding plastic material differing from the types described above.

While the invention has been illustrated and described as embodied in apparatus for providing a plurality of bodies from a mass of plastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for providing a plurality of bodies from a plastic mass, in combination, extruder means having a nozzle formed with a plurality of discharge outlets distributed around a predetermined axis, said extruder extruding a material out through said outlets in plastic, tacky condition; rotary cutting means located directly next to said nozzle, rotating around said axis, and cutting the material issuing from said outlets into a plurality of bodies; and centrifugal means located directly next to said cutting means on the side thereof opposite from said nozzle for receiving from said cutting means the plurality of bodies cut thereby and for throwing said bodies centrifugally away from said axis, while maintaining said bodies out of engagement with each other, freely through a gas over a distance sufficient to cause the bodies to lose their tackiness while they are still in flight, said centrifugal means including a rotary hub coaxial with said cutting means and also rotating about said axis and a plurality of blades distributed about said axis and extending outwardly from said hub, each of said blades being along the whole length thereof connected to said hub and each of said blades having an end portion located next to said cutting means at the same radial distance from said axis as said discharge openings formed with a notch into which the material issuing from the outlets may move without being engaged by said blades until the material is cut by said cutting means.

2. In an apparatus for providing a plurality of bodies from a plastic mass, in combination, extruder means having a discharge nozzle formed with a plurality of discharge outlets distributed about a predetermined axis, said extruder means extruding through said outlets a material in plastic, tacky condition; a shaft extending along said axis from said nozzle; at least one cutting blade fixed to and extending radially from said shaft and sliding along an exterior face of said nozzle across said outlets thereof so that during rotation of said shaft said blade cuts the material issuing from said outlets into a plurality of bodies; a sleeve freely turnable on said shaft and located next to said blade; and a plurality of vanes greatly exceeding in number the number of cutting blades and fixed over the whole length thereof to and extending in radial direction outwardly from said sleeve, said vanes being distributed about said axis and rotating with said sleeve and said vanes respectively having free end portions located close enough to said blade to receive the bodies therefrom, so that during rotation of said sleeve and vanes the bodies will be centrifugally thrown from said vanes, whereby the thrown bodies upon moving freely through a space sufficient to cause them to lose their tackiness while they are still in flight may thereafter be collected without sticking to each other.

3. In an apparatus for providing a plurality of bodies from a plastic mass, in combination, extruder means having a discharge nozzle formed with a plurality of discharge outlets distributed about a predetermined axis, said extruder means extruding through said outlets a material in plastic, tacky condition; a shaft extending along said axis from said nozzle; at least one cutting blade fixed to and extending radially from said shaft and sliding along an exterior face of said nozzle across said outlets thereof so that during rotation of said shaft said blade cuts the material issuing from said outlets into a plurality of bodies; a sleeve freely turnable on said shaft and located next to said blade; a plurality of vanes greatly exceeding in number the number of cutting blades and fixed over the whole length thereof to and extending in radial direction outwardly from said sleeve, said vanes being distributed about said axis and rotating with said sleeve and said vanes respectively having free end portions located close enough to said blade to receive the bodies therefrom, so that during rotation of said sleeve and vanes the bodies will be centrifugally thrown from said vanes, whereby the thrown bodies upon moving freely through a space sufficient to cause them to lose their tackiness while they are still in flight may thereafter be collected without sticking to each other; and a hollow cylindrical wall coaxially surrounding said vanes and having an inner surface directed toward said shaft and spaced from said vanes at a distance great enough to guarantee that the bodies thrown from the vanes will not engage the inner surface of said wall until they have lost their tackiness.

4. A method of forming small bodies from a plastic mass, comprising the steps of extruding the plastic mass in tacky condition through a nozzle; cutting the extruded material issuing from the nozzle into small bodies; and centrifugally throwing said bodies, while maintaining the same out of engagement with each other, freely through a gas over a distance sufficient to cause said bodies to lose their tackiness while they are still in flight, whereby when said bodies are thereafter collected they will not cling or otherwise adhere to each other.

5. A method of forming small bodies from a plastic mass comprising polyvinyl chloride including a plasticizer and a stabilizer, comprising the steps of extruding the plastic mass at a temperature of about 200° centigrade in tacky condition through a nozzle; cutting the extruded material issuing from the nozzle into small bodies; centrifugally throwing said bodies, while maintaining the same out of engagement with each other, freely through a gas over a distance sufficient to cause said bodies to lose their tackiness while they are still in flight; and limiting the throw of said bodies to a distance of about 50 cm.

6. A method for forming small bodies from a plastic mass, comprising the steps of extruding the plastic mass in tacky condition through a plurality of nozzles; cutting the extruded material issuing from said nozzles into small bodies while preventing contact of the cut off bodies with each other; and centrifugally throwing said bodies, while maintaining the same out of engagement with each other, freely through a gas over a distance sufficient to cause said bodies to lose their tackiness while they are still in flight, whereby when said bodies are thereafter collected they will not cling or otherwise adhere to each other.

7. A method as defined in claim 6 in which the plastic mass is extruded in heated condition through said plurality of nozzles and comprising the further step of uniformly cooling said plurality of nozzles while the plastic mass is extruded therethrough.

References Cited in the file of this patent

UNITED STATES PATENTS

| 786,573 | Lessing | Apr. 4, 1905 |
| 1,294,909 | Howell | Feb. 18, 1919 |
| 2,192,944 | Thomas | Mar. 12, 1940 |
| 2,525,970 | Spier et al. | Oct. 17, 1950 |
| 2,594,894 | Fehrenbach | Apr. 29, 1952 |

FOREIGN PATENTS

| 685,605 | Great Britain | Oct. 10, 1951 |